United States Patent [19]
Higginbottom

[11] 3,956,204
[45] May 11, 1976

[54] ANTIPUNKING PHENOLIC RESIN BINDER SYSTEMS FOR MINERAL FIBER THERMAL INSULATION

[75] Inventor: Harold P. Higginbottom, Wilbraham, Mass.

[73] Assignee: Monsanto Company, St. Louis, Mo.

[22] Filed: Mar. 10, 1975

[21] Appl. No.: 556,597

[52] U.S. Cl. ................................. 260/7; 260/29.3; 260/51.5; 260/839; 260/840; 428/290
[51] Int. Cl.$^2$ ......................................... C08L 89/00
[58] Field of Search ............................... 260/7, 29.3

[56] References Cited
UNITED STATES PATENTS

| | | | |
|---|---|---|---|
| 2,385,374 | 9/1945 | Rhodes | 260/7 |
| 2,451,153 | 10/1948 | Charlton et al. | 260/839 |
| 3,046,103 | 7/1962 | Barth | 260/7 |
| 3,342,776 | 9/1967 | Lambuth | 260/7 |
| 3,366,694 | 5/1972 | Ingram | 260/7 |
| 3,547,868 | 12/1970 | Schwartzenburg | 260/29.3 |
| 3,616,181 | 10/1971 | Stalego | 161/170 |
| 3,823,103 | 7/1974 | Harding | 260/17.2 |
| 3,862,060 | 1/1975 | Anderson | 260/7 |
| 3,907,724 | 9/1975 | Higginbottom | 260/7 |

*Primary Examiner*—Donald E. Czaja
*Assistant Examiner*—Edward Woodberry
*Attorney, Agent, or Firm*—Joseph S. Nelson; Edward P. Grattan; James C. Logomasini

[57] ABSTRACT

Phenolic resin antipunk systems for thermal insulation, characterized by stability and a low level of volatile pollutants. The aqueous resin systems contain a resole component and an antipunk component. They are prepared by a three-step reaction which controls the degree of reaction, the molecular weight and the water tolerance of the resole component. Stability is promoted by inhibition of the crystallization of bis(4-hydroxy-3,5-dimethylolphenyl) methane.

19 Claims, No Drawings

ANTIPUNKING PHENOLIC RESIN BINDER SYSTEMS FOR MINERAL FIBER THERMAL INSULATION

BACKGROUND OF THE INVENTION

1. Field of the Invention

The present invention relates to phenol-formaldehyde liquid resin systems which are stable on storage and contain low levels of volatile pollutants.

2. DESCRIPTION OF THE PRIOR ART

The concept of mineral fibers bonded with phenol-formaldehyde resin was developed as a means of producing thermal insulation of low density. Such insulation is deficient in its ready susceptibility to flameless combustion or "punking" which is considered to be an autocatalytic oxidative degradation.

The art has employed various combinations of aminoplasts such as urea, melamine or dicyandiamide with phenol and formaldehyde to obtain so-called "antipunking" resins. For optimum high temperature antipunking properties, significant levels of dicyandiamide or melamine or combinations of these and a minimum combined formaldehyde are generally required. Several systems have been developed as means to achieve the desired properties but many of the systems lack the storage stability required in commercial resins which must often be stored for long periods of time and shipped to distant places. In storage, solids precipitate and plug pumps, pipes, filters and spray nozzles when the resins are being transferred or applied to the mineral fiber batts.

A storage stable anti-punk system of the prior art comprises green phenolic resins obtained by limited reaction of phenol and formaldehyde, the high concentrations of unreacted formaldehyde being co-reated with dicyandiamide or melamine to solubilize the anti-punk additive. When the ratio of formaldehyde combined with phenol is above 2, the resin systems are very unstable upon storage at conventional temperatures when the free formaldehyde content falls below 3 to 4 percent.

A method of stabilizing anti-punk systems containing phenolic resin resolves advanced to reduce the phenol content, is disclosed in co-pending application Ser. No. 459,524 filed Apr. 10, 1974. This method requires the addition of an alkoxymethylaminotriazine to the anti-punk system and is found to provide improved thermal stability to the insulation binder as well as stability to the aqueous system. However, a need exists for a low cost anti-punk system without a relatively expensive alkoxymethylaminotriazine, which contains a low level of volatile pollutants and is storage stable.

SUMMARY OF THE INVENTION

The need is fulfilled by the present invention which provides a single-phase storage-stable aqueous phenolic anti-punk resin system comprising a resole and a condensate of formaldehyde and a nitrogenous compound selected from the group consisting of ammonia, urea, dicyandiamide and melamine; wherein the system has a pH in the range of 6 to 8.5 and contains less than 2 percent of free phenol and less than 2 percent of free formaldehyde based on the weight of the resole; wherein the resole has a number average molecular weight of less than 400, a water tolerance in the range of about 50 to 800 percent and a combined formaldehyde to phenol molar ratio in the range of 2.0:1 to 2.5:1; wherein the condensate has a molar ratio of combined formaldehyde to nitrogenous compound in the range of 0.5:1 to 1.5:1 wherein the molar ratio of combined phenol to nitrogenous compound is in the range of about 0.61:1 to 2:1; and wherein the resin system contains sufficient methylolated 2,2'-and 2,4'-dihydroxydiphenylmethanes to inhibit crystallization of the resole.

Another aspect of the invention is directed to emulsifiable single-phase storage-stable aqueous phenolic anti-punk resin systems obtained by adding between about 0.1 to 5 parts of a proteinaceous compound per 100 parts of the combined weight of the resole and the condensate of the nitrogenous compound. The proteinaceous compound is of the type which is soluble in aqueous media at a pH in the range of 7 to 10.

Another aspect of the invention is directed to storage-stable emulsified aqueous phenolic anti-punk resin systems obtained by adding water beyond the water tolerance point to the emulsifiable system.

Yet another aspect of the invention is directed to a process of preparing an aqueous solution of a phenolic anti-punk resin system by a three-step reaction which comprises:

a. reacting 1.0 mole phenol with from 0.05 to 0.30 moles formaldehyde under conditions for formation of novolac resin, b. adding from 1.75 to 4.0 moles formaldehyde and reacting under basic conditions to produce a resole of molecular weight less than 400 and water tolerance between about 50 and 800 percent, and containing less than 2 weight percent free phenol, c. adding between about 0.5 to 1.64 moles of a nitrogenous compound selected from the group consisting of ammonia, urea, dicyandiamide and melamine and reacting the nitrogenous compound to reduce the free formaldehyde content to less than 2 weight percent of the resole, and d. adjusting the pH to between 6 and 8.5 at 25°C.

Further aspects of the invention are directed to a process of preparing an emulsifiable resin system by addition of a proteinaceous compound to the resin system and to a process of preparing an emulsified resin system by addition of water beyond the water tolerance point of the emulsifiable resin system.

THE PREFERRED EMBODIMENTS

The aqueous storage-stable single-phase phenolic resin systems of the present invention are prepared by a three-stage reaction. The first stage of the reaction is carried out under novolac forming conditions in the presence of an acid catalyst of a pK less than 5 and soluble in the reaction medium. From 0.05 to 0.30 moles of formaldehyde are reacted with one mole of phenol in this novolac stage. The formaldehyde to phenol ratio is kept low so that dimer formation is favored and formation of higher oligomers is suppressed. The acid catalyst may be a strong acid catalyst such as hydrochloric acid, sulphuric acid, oxalic acid, sulfamic acid, benzene sulfonic acid or toluene sulfonic acid or may be an organic carboxylic acid such as acetic acid. It may be a salt of a divalent metal such as zinc chloride, zinc acetate, lead octoate and similar salts of carboxylic acid which are conventionally used for the preparation of high ortho novolacs.

The novolac reaction is carried out at temperatures in the range of 60° to 200°C., the particular temperature being readily selected for the appropriate catalyst by the skilled worker in order to obtain novolac methylene bridged compounds. Normally with strong acid catalyst the reaction is carried out at atmospheric reflux at temperatures in the range of 100° to 120°C.

The acid stage reaction product is believed to be predominantly a mixture of the three methylene bridged dimers (2,2-dihydroxydiphenylmethane, 2,4'-dihydroxydiphenylmethane and 4,4'-dihydroxydiphenylmethane). The dimer composition can be varied by modification of the acid stage catalyst and reaction conditions. Thus, when high ortho directing catalysts such as zinc acetate and other salts of divalent metals are used for the reaction should be carried out at elevated temperatures in order to break orthobenzyl ether groups and form a high concentration of 2,2'-dimer. Strong acids at atmospheric reflux yield a ratio of 2,2'-, 2,4'- and 4,4'-dimers of approximately 0.14 to 0.53 to 0.33. Dimer mixtures containing a high proportion of the 4,4'-dimer which are less desirable for the purposes of the invention can be obtained by reaction of formaldehyde with phenol in the presence of strong acids at low temperatures in the range of 50° to 60°C.

The methods of carrying out novolac reactions are well known in the art. Thus, the reaction may be effected by reaction of phenol and paraformaldehyde under anhydrous conditions with removal of water of condensation by azeotropic distillation or it may be carried out in the presence of water generated by the reaction or added to the reaction medium as an aqueous formalin solution containing between 30 and 70 percent formaldehyde.

The second stage or resole stage is conducted after neutralizing the novolac stage with a basic compound. The same basic compound as used in the resole reaction stage is conveniently utilized for neutralization. Typically from 1.7 to 4.0 moles of formaldehyde per mole original phenol is added for the basic reaction. Between 0.05 and 0.30 mole equivalent of base per mole or original phenol in excess of the amount required for neutralization is then added. The reaction is carried out at a temperature range of from 40° to 80° with preferred range being 50° to 70° so that an adequate rate of reaction may be obtained without excessive oligomerization of the resole. The reaction is continued until the concentration of unreacted phenol is less than 2 weight percent of the resin solids and the combined formaldehyde to phenol ratio determined by conventional methods is in the range of 2.0 to 2.5.

The resole reaction may also be carried out under anhydrous or hydrous conditions. However, since the application of the resole resin system to mineral fiber in the preparation of thermal insulation is conventionally carried out with aqueous solutions, it is generally convenient to carry out the resole reaction with aqueous formalin solutions containing between 30 and 70 percent formaldehyde. The catalyst for the resole stage is a conventional basic catalyst of pK greater than 9, soluble in the reaction medium. Typical bases include alkali metal hydroxides such as lithium hydroxide, sodium hydroxide and potassium hydroxide; alkali metal carbonates such as sodium carbonate and potassium carbonate, alkaline earth hydroxides such as magnesium hydroxide, calcium hydroxide and barium hydroxide, aqueous ammonia and amines of molecular weight less than 300.

When the second stage of the reaction is complete, i.e., when the unreacted phenol concentration is less than 2 weight percent of the resin solids, a nitrogenous compound selected from the group consisting of ammonia, urea, dicyandiamide and melamine is added to provide a molar ratio of nitrogenous compound to total phenol charged to the original reaction mixture in the range of about 1:0.61 to 1:2 and a molar ratio of nitrogenous compound to formaldehyde in the range of 1:0.5 to 1:1.5. The formaldehyde necessary for the third stage of the reaction is conveniently added at the start of the second or resole stage with the formaldehyde required for reaction in the second stage. Alternatively it may be added at the beginning of the third stage. However, the total amount of formaldehyde added in the three stages should not exceed 4.3 moles to avoid excessive evolutions of formaldehyde at the curing stage of the resin system and impairment of thermal stability of the cured resin. Reaction between the nitrogenous compound and the formaldehyde is carried out at a temperature in the range of 40° to 80°C., and preferably in the range of 40° to 60°C. to minimize advancement of the resole resin component. While the molar ratio of the total nitrogenous compound to total phenol is in the range of 1:0.75 to 1:2, it is preferred to limit the amount of ammonia to 0.4 mole per mole of phenol and to limit the amount of dicyandiamide or melamine to 0.6 mole per mole of phenol with the remainder made up of urea. However the entire nitrogenous compound can be urea up to the limit of 1.64 mole per mole of phenol.

At the end of the reaction the catalyst is neutralized by addition of acid or acid salt to reduce the pH to between 6 and 8.5. For example when the catalyst is sodium hydroxide, phosphoric acid is commonly used for neutralization, and sulfuric acid is used to neutralize barium hydroxide. Preferably the pH is adjusted to between 7 and 8.

As is well known in the art, the normal base catalyzed addition reaction of formaldehyde with phenol produces a mixture of 5 mono, di and tri-methylolated phenol monomers which are potential intermediates for dimer formation via condensation. In dimerization of these methylolated phenols the formation of bis(4-hydroxy3,5-dimethylolphenyl) methane is favored and when the ratio of formaldehyde to phenol is high, i.e., when it is above 2.0, substantial amounts of bis(4-hydroxy-3,5-dimethylolphenyl) methane are formed. Even when the proportion of bis(4-hydroxy-3,5-dimethylolphenyl) methane is relatively low and the methylolated phenols are in relatively high concentration, the bis(4-hydroxy 3,5-dimethylolphenyl) methane crystallizes out from conventional resole resin systems when the formaldehyde content is below 3 percent and the pH is adjusted to less than 8.5, particularly at pH in the range 6 to 8 and low temperatures in range of about 0°–20°C. preferred for storage. This crystal phase is extremely difficult to redissolve. Elevated temperatures help to redissolve it but unfortunately exposure to high temperatures advances the resin, increasing its molecular weight and causing application problems such as chain sticking when the resin system is applied as a binder to mineral fiber batts. Filtering out the crystals is of little benefit because the resulting resin is reduced in efficiency and the bonding characteristics are impaired. Moreover, the economics of the process become unfavorable and a problem of disposing of bis(4-hydroxy-3,5-dimethylolphenyl) methane is created. By the methods of this invention, during the base stage condensation, the 2,2'-, 2,4'- and 4,4'-dihydroxydiphenylmethanes formed during the acid stage, are methylolated in the same fashion as phenol. Thus the first two stages of the process introduce methylolated 2,2'-and 2,4'-dihydroxyphenylmethanes into the resole resin system which, unlike methylolated phenols, unexpectedly suppress crystallization and precipitation of bis(4-hydroxy-3,5-dimethylolphenol) methane and allow free formaldehyde to be reduced almost to 0 without impairing the stability of the resole resin system at normal storage temperatures. Moreover, by manipulating the acid stage reaction, the molecular weight of the resole component is controlled so that it can be limited to less than 400 and resoles of molecular weight in the range of 180 to 400 with a ratio of combined formaldehyde to phenol in the range of 2.0 to 2.5 and a reproducible water tolerance are readily obtained.

Water tolerance is determined at 25°C. by addition of water to the resole until a slight permanent haze forms. The tolerance is the weight of water expressed as a percent by weight of the resin solids. Thus, where the haze point occurs when 80 parts by weight of water impart haze to 20 parts by weight of resole resin solids, the tolerance is 400 percent. The resoles of the present invention are found to have a water tolerance in the range of 50 to 800 percent.

The amount of formaldehyde reacted with phenol during the acid stage is in the range of 0.05 to 0.30 mole per mole of phenol and is determined by the amount of methylolated dihydroxydiphenylmethanes needed to impart adequate storage stability and to control the properties of the final resole resin system. The amount required varies with the final combined formaldehyde to phenol ratio in the resole component and depends in part on the amount of condensate of formaldehyde and nitrogenous compound and the excess nitrogenous compound added at the third stage. However, in general when the molar ratio of combined formaldehyde to phenol is about 2.0, the amount of formaldehyde reacted in the acid stage can be as low as 0.05 mole per mole of phenol and when the combined formaldehyde to phenol is about 2.5, the amount of formaldehyde reacted in the acid stage is preferably between 0.20 and 0.30 mole per mole of phenol.

In general, when the molecular weight of the resole is in the range of 180 to 400, the resole contains between 5 and 90 weight percent of methylolated dihydroxydiphenylmethanes. In conventional resoles, the methylolated dihydroxydiphenylmethanes comprise almost exclusively bis(4-hydroxy-3,5-dimethylolphenyl) methane. As a result of the staged reaction of the present invention as much as 80 percent of the methylolated dihyroxydiphenylmethanes may be comprised of methylolated 2,2'- and 2,4'-dihydroxydiphenylmethanes. However in practice, the initial acid stage reaction is carried out with a proportion of formaldehyde and phenol to provide the resole component of the resin system containing between 5 and 50 weight percent of the methylolated di-hydroxydiphenylmethanes as methylolated 2,2'- and 2,4'-dihydroxydiphenylmethanes. Because of the high ratio of formaldehyde combined with phenol in the resoles, the average degree of methylolation of the dimers is in the range of 3 to 4.

The three-stage reaction allows the phenol and formaldehyde concentrations to be reduced to zero without stability problems occurring. The second stage is therefore carried out until the phenol content is reduced to below 2 percent based on the weight of the resole and similarly the third stage is continued until the formaldehyde content of the resin system is below 2 percent of the weight of the resole component. In practice, concentrations of free or unreacted phenol and formaldehyde below 1 percent are readily obtained.

The stable single phase aqueous phenol-formaldehyde resins of this invention are particularly desirable for use in applications which require low pollution potential on application. Because of the low levels of residual phenol and formaldehyde possible by this invention undesirable volatiles generated by drying and curing the resole are significantly reduced. The aqueous resin systems of the present invention also possess very little of the strong odor of phenol and formaldehyde and this lack of odor is readily apparent when the resin systems are applied from open dip tanks, or coaters onto substrates which are passed over drying rolls, through dring ovens, or into curing presses and ovens in poorly vented areas.

The aqueous phenolic resin systems of this invention are useful in the preparation of thermal insulation. In the application of the phenolic resin system to a matrix of mineral fiber in the preparation of such thermal insulation, it is conventional to apply the resin at a concentration of 8 percent solids or less, although higher solids may be used with suitable spray equipment. Because of the water tolerance of the aqueous phenolic resin systems of the present invention, dilution with water to 8 percent solids or less causes phase separation and precipitation of the resole component. It is therefore convenient to add an emulsifying agent to the resin system prior to addition of water so that when water is added and the resin system is agitated an emulsion of the phenolic resin system is formed.

Proteinaceous compounds which are soluble in aqueous media at a pH in the range of from 7 to 10 are suitable emulsifiers and are added as aqueous solutions to the aqueous phenolic resin system prior to emulsification. Such compounds are well known to those skilled in the art and are disclosed in U.S. Pat. No. 3,666,694.

The solutions are prepared in the presence of a base selected from the group consisting of alkali metal hydroxides and carbonates, ammonium hyroxide and water soluble aliphatic amines. The amount of base used for solubilization of the protein should not raise the pH of the emulsifiable resin system about 8.5. It is advantageous to add urea to the proteinaceous solution as a viscosity control agent. The most commonly used proteinaceous materials are casein and soya protein. Common molecular weights range from 100,000 to 400,000. The quantity of proteinaceous compound necessary for stability of the aqueous water dilutable phenolic resin is determined by the molecular weight of the resole component. In general, a high molecular weight requires a high concentration of proteinaceous compound. The preferred quantity of proteinaceous compound is between 0.1 and 5 weight percent of the total resin solids. Below 0.1 weight percent, the phenolic resin system loses its water emulsifiability while above 5 weight percent proteinaceous compound, the phenolic resin system exhibits impaired thermal stability.

As those skilled in the art readily appreciate, if the resins of this invention are used with protein type emulsifiers the acid and base catalyst as well as the neutralizing agent must be carefully selected to avoid interfering with emulsifier action. Polyvalent metal ions must be avoided or removed from the system.

The following examples are set forth to illustrate more clearly the principles and practices of this invention to one skilled in the art. They are not intended to be restrictive but merely to be illustrative of the invention. Unless otherwise stated, all parts, percentages and ratios are on a weight basis. Solids are determined by the Owens solids method.

EXAMPLE I

Acid Stage Reaction

A phenol-formaldehyde acid catalyzed condensate is prepared by reacting 0.28 mol of formaldehyde (50% aqueous) per 1 mol of phenol in the presence of 0.004 mol of hydrochloric acid at atm. reflux until the formaldehyde consumption exceeds 98%.

Base Stage Reaction

The acid stage reaction product is cooled and neutralized with 0.02 mol of caustic and 2.54 mols of formaldehyde (50% aqueous) is added. A base catalyzed reaction is conducted at 50° to 70°C. in the presence of 0.044 mol of calcium hydroxide until the unreacted formaldehyde content drops to 7.0%. The reaction is cooled to 55°C. and 0.08 mol of melamine is added and reacted at 55°C. for 20 minutes. The reaction is cooled to 50°C. and 0.07 mol of ammonia (29% aqueous) and 0.55 mol of urea are added. The resin is neutralized to a pH of 7.4. The resin solution is stored below 5°C. for five months without any phasing or precipitation of insolubles. Resin properties are summarized in Table I.

EXAMPLE II

The procedure of Example I is repeated with 0.14 mol of dicyandiamide and 0.05 mol of melamine substituted for 0.08 mol of melamine. The reaction is cooled to 50°C. and 0.07 mol of ammonia (29% aqueous) and 0.63 mol of urea are added. The resin is neutralized to a pH of 7.8. Resin properties are summarized in Table I. The resin solution is stored below 5°C. for five months without any precipitation or phasing.

EXAMPLE III

This Example is made eliminating the acid stage reaction used in Examples I and II. Phenol (1.0 mol) and 2.90 mol of formaldehyde (50% aqueous) are reacted at 50° to 70°C. reflux in the presence of 0.02 mol of sodium hydroxide and 0.044 mol of calcium hydroxide until the formaldehyde content drops to 7.0%. The reaction is cooled to 55°C. and 0.14 mol of dicyandiamide and 0.04 mol of melamine are added and reacted for 20 minutes. The reaction is cooled to 50°C. and 0.07 mol of ammonia (29% aqueous) and 0.63 mol of urea are added. The resin is neutralized to a pH of 7.7. Resin properties are summarized in Table I. The resin solution is stored below 5°C. for five days and a significant amount of crystalline deposit forms during this period. An infrared analysis identifies the deposit as bis(4-hydroxy-3,5′dihyroxymethylphenyl) methane.

EXAMPLE IV

Acid Stage Reaction

The procedure of Example I is repeated reacting 0.16 mol of formaldehyde (50% aqueous) per 1 mol of phenol in the presence of 0.004 mol of sulfamic acid.

Base Stage Reaction

The acid stage reaction product is cooled and neutralized with 0.02 mol of caustic and 2.74 mol of formaldehyde (50% aqueous) is added. A base catalyzed reaction is conducted at 50° to 70°C. in the presence of 0.044 mol of calcium hydroxide until the unreacted formaldehyde content drops to 7.0%. The reaction is cooled to 55°C. and 0.14 mol of dicyandiamide and 0.04 mol of melamine are added and reacted for 20 minutes. The reaction is cooled to 50°C. and 0.07 mol of ammonia (29% aqueous) and 0.63 mol of urea are added. The resin is meturalized to a pH of 7.7. Resin properties are summarized in Table I. The resin solution is stored below 5°C. for six months without any precipitation or phasing.

EXAMPLE V

Acid Stage Reaction

The procedure of Example I is repeated reacting 0.16 mol of formaldehyde (50% aqueous) per 1 mol of phenol in the presence of 0.004 mol of sulfamic acid.

Base Stage Reaction

The acid stage reaction product is cooled and neutralized with 0.012 mol of sodium hydroxide and 3.64 mol of formaldehyde (50% aqueous) is added. A base catalyzed reaction is conducted at 50° to 70°C. in the presence of 0.082 mol of sodium hydroxide (catalyst added incrementally to control exotherm) until the unreacted formaldehyde content drops to 13.0%. The reaction is cooled to 55°C. and 0.28 mol dicyandiamide and 0.08 mol melamine are added and reacted for 30 minutes. The reaction is cooled to 50°C. and 0.14 mol of ammonia (20% aqueous) and 0.98 mol of urea are added. The resin is neutralized to a pH of 8.0 with 0.07 mol of boric acid. The resin solution is stored below 5°C. for over three months without any phase separation or precipitation of insolubles. Resin properties are summarized in Table I.

EXAMPLE VI

The procedure of Example I is repeated and the product is neutralized with carbon dioxide to precipitate calcium and remove it prior to the addition of protein emulsifier. Five and one half parts soya protein solution (20% in protein solids) are added to each 100 parts of resin solution to form an emulsifiable resin solution. A stable dispersion forms when water is added to a sample of the emulsifiable resin solution in excess of the water tolerance.

The emulsifiable resin solution is stored below 5°C. for five months without any phase separation or precipitation of insoluble material. While the water tolerance decreases slightly, the resin retains its emulsifiability, yielding stable dispersions when water in excess of the water tolerance is added. Resin properties are summarized in Table II.

The soya protein solution is prepared as follows: Urea (30 parts) is dissolved in water (48.5 parts) and soya protein (20 parts) is added and slurried. After thirty minutes, ammonia solution (1.5 parts) is added and allowed to mix for thirty minutes. The appropriate amount of solution is then added to the resin to form the emulsifiable resin solution.

EXAMPLE VII

The procedure of Example III involving a conventional one-stage base catalyzed reaction is repeated. The product is neutralized with carbon dioxide and calcium is removed. Five and one half parts of soya protein solution (20% in protein solids) are added to each 100 parts of resin solution to form an emulsifiable resin solution. A dispersion forms when water is added to a sample of the emulsifiable resin solution in excess of the water tolerance.

The emulsifiable resin solution is stored below 55°C. A crystalline deposit appears after 3 days. This deposit increases significantly with storage time and is identified by infrared analysis to be bis(4-hydroxy-3,5'-dihydroxymethylphenyl) methane. Resin properties are summarized in Table II.

EXAMPLE VIII

The procedure of Example IV is repeated. Five and one half parts of soya protein solution (20% in protein solids) are added to each 100 parts of neutralized resin solution to form an emulsifiable resin solution. A stable dispersion forms when water is added to a sample of the emulsifiable resin solution in excess of the water tolerance.

The emulsifiable resin solution is stored below 5°C. for 6 months without any phasing or precipitation of insolubles. While the water tolerance decreases slightly, the resin retains its emulsifiability, yielding stable dispersions when water in excess of the water tolerance is added.

Resin properties are summarized in Table II.

EXAMPLE IX

The procedure of Example V is repeated. Five and one half parts of soya protein solution (20% in protein solids) are added to each 100 parts of neutralized resin solution to form an emulsifiable solution. A stable dispersion forms when water is added to a sample of the emulsifiable resin solution in excess of the water tolerance.

The emulsifiable resin solution is stored below 5°C. for over three months without any phase separation or precipitation of insolubles. While the water tolerance decreases slightly, the resin retains its emulsifiability, yielding stable dispersions when water in excess of the water tolerance is added. Resin properties are summarized in Table II.

The properties of the resoles and the emulsifiable resoles are tabulated in Tables I and II. The properties are measured directly on neutralized resin unless indicated otherwise. The values for the mole ratio of formaldehyde combined with phenol (combined F/P), degree of polymerization and number average molecular weight ($M_n$) are determined by nuclear magnetic resonance procedures as described in *J. Polym. Sci.* A-1, 3, 1079 (1965). The stability of the aqueous resoles is measured on refrigerated samples at 0° to 5°C. and indicates the time in days to appearance of a crystalline phase or insolubles in the solution. The percent formaldehyde measurements on the reaction mixtures and final products are determined by the hydroxylamine hydrochloride test.

TABLE I

| PROPERTIES OF AQUEOUS PHENOLIC RESIN SYSTEMS | | | | | |
|---|---|---|---|---|---|
| EXAMPLE | I | II | III | IV | V |
| Reactants, moles per mole of phenol | | | | | |
| Total Formaldehyde | 2.82 | 2.90 | 2.90 | 2.90 | 3.80 |
| Acid Stage Formaldehyde | 0.28 | 0.28 | 0 | 0.16 | 0.16 |
| Co-Reactants | | | | | |
| NH$_3$ | 0.07 | 0.07 | 0.07 | 0.07 | 0.14 |
| Urea | 0.55 | 0.63 | 0.63 | 0.63 | 0.98 |
| Dicyandiamide | 0 | 0.14 | 0.14 | 0.14 | 0.28 |
| Melamine | 0.08 | 0.04 | 0.04 | 0.04 | 0.08 |
| FINAL RESIN PROPERTIES | | | | | |
| pH, 25°C. | 7.35 | 7.8 | 7.7 | 7.6 | 7.6 |
| OWENS SOLIDS, % | 55.0 | 57.9 | 57.6 | 56.1 | 55.0 |
| BROOKFIELD VISC. cps | 35 | 40 | 25 | 29 | 27 |
| WATER TOLERANCE, % | 245% | 230% | 1300% | 350% | 430% |
| Free Phenol % | 0.84 | 0.57 | 0.84 | 1.16 | 0.20 |
| Free Formaldehyde, % | 0.96 | 0.30 | 0.60 | 0.55 | 1.0 |
| Combined F/P | 2.23 | 2.28 | 2.19 | 2.18 | 2.29 |
| $M_n$ | 355 | 370 | 220 | 223 | 236 |
| Degree of Polymerization | 2.33 | 2.33 | 1.32 | 1.45 | 1.49 |
| Stability, days at 0–5°C. | >150 | >150 | <5 | 180 | >90 |

TABLE II

| PROPERTIES OF EMULSIFIABLE AQUEOUS PHENOLIC RESIN SYSTEMS | | | | |
|---|---|---|---|---|
| EXAMPLE | VI | VII | VIII | IX |
| Reactants, moles per mole of phenol | | | | |
| Total Formaldehyde | 2.82 | 2.90 | 2.90 | 3.80 |
| Acid Stage Formaldehyde | 0.28 | 0 | 0.16 | 0.16 |
| Co-Reactants | | | | |
| NH$_3$ | 0.07 | 0.07 | 0.07 | 0.14 |
| Urea | 0.55 | 0.63 | 0.63 | 0.98 |
| Dicyandiamide | 0 | 0.14 | 0.14 | 0.28 |
| Melamine | 0.08 | 0.04 | 0.04 | 0.08 |
| FINAL RESIN PROPERTIES | | | | |
| pH, 25°C. | 7.4 | 7.8 | 7.6 | 7.7 |
| OWENS SOLIDS, % | 54.5 | 57.0 | 56.1 | 54.5 |
| WATER TOLERANCE, % | 240 | 1100 | 300 | 400 |
| Free Phenol % | .82 | .80 | 1.10 | .20 |
| Free Formaldehyde, % | .90 | .65 | .50 | 1.0 |

TABLE II-continued
PROPERTIES OF EMULSIFIABLE AQUEOUS PHENOLIC RESIN SYSTEMS

| EXAMPLE | VI | VII | VIII | IX |
|---|---|---|---|---|
| Combined F/P | 2.23 | 2.19 | 2.18 | 2.29 |
| $M_n$ | 355 | 220 | 223 | 236 |
| Degree of Polymerization | 2.33 | 1.32 | 1.45 | 1.49 |
| Stability, days at 0–5°C. | >150 | <5 | 180 | >90 |

The data of Tables I and II show the stability of the aqueous phenolic resin systems and the emulsifiable resin systems which are prepared by the three-step reaction process of the present invention (Examples 1, 2, 4–6, 8 and 9). In comparison Examples 3 and 7, which contain conventional resole components and have been reacted to similar low values for free formaldehyde and free phenol, demonstrate crystallization and phase separation within a short time after preparation.

These examples containing conventional resole components are therefore unsuitable for shipping and storage because the crystalline deposits tend to block lines and filters, and cause non-uniform application to the matrix of mineral fiber. When these conventional resoles are heated to redissolve the crystalline phase, they increase in molecular weight and cause chain-sticking problems because of their increased tack.

The clear, one phase, homogeneous, emulsifiable resins of this invention may be easily converted to resin in water emulsions by the simple addition of water with sufficient agitation to permit effective blending of the water. This can normally be accomplished with the use of conventional propellor blade or turbine agitators. Depending upon the degree of dilutibility of the emulsifiable resin, i.e., degree of advancement, the formation of phenolic resole emulsion may be first characterized by a slight lowering of viscosity as the initial water added dissolves, followed by a rapid increase in viscosity with the formation of a water-in-oil emulsion and a peak viscosity at the point at which the system inverts to a resin in water emulsion. Such is the case with a relatively high degree of advancement of emulsifiable resin systems having a relatively low degree of water dilutibility, e.g., about 50 percent. Alternately, with lower advanced phenolic resole emulsifiable resins, emulsification may be accomplished by no noticeable increase in viscosity and result directly in a resin in water emulsion.

Thermal insulation is prepared by applying the phenolic resin system of the present invention to a matrix of mineral fiber. The preferred fiber is glass. For example, the phenolic resin system is diluted with water to form a solution or dispersion containing between 2 and 25 percent solids. The aqueous dispersion or solution is applied to a matrix of glass fibers in an amount sufficient to yield a matrix containing from about 2 to about 15 percent by weight of cured resin. The matrix is subjected to drying conditions by forcing a volume of air heated at 100°F. through the matrix for a period of 3 minutes. The dried matrix is placed in a mold and cured for 2 minutes at 400°F. In another method of preparing thermal insulation, the diluted solution or dispersion is sprayed onto glass fibers immediately after the fibers have been formed and while they are falling through the air onto a conveyor to form a mat. The mat is then advanced on the conveyor compressed against another conveyor to the required density and is heated to a temperature in the range of 400°–500°F.

The resins of the present invention have outstanding application characteristics and efficiency. The smaller quantity of volatile organic material liberated during drying and curing of the impregnated matrix decreases atmospheric pollution. The binder composition can be formulated with silanes and lubricants to gain property benefits well known to the art.

From the foregoing, it is obvious that many variations are possible in the practice of the invention, without departing from the spirit and scope thereof.

What is claimed is:

1. A single-phase storage-stable aqueous phenolic antipunk resin system which comprises a resole and a condensate of formaldehyde and a nitrogenous compound selected from the group consisting of ammonia, urea, dicyandiamide and melamine; wherein the system has a pH in the range of 6 to 8.5 and contains less than 2 percent of free phenol and less than 2 percent of free formaldehyde based on the weight of the resole, wherein the resole has a number average molecular weight of less than 400, a water tolerance in the range of about 50 to 800 percent and a combined formaldehyde to phenol molar ratio in the range of 2.0:1 to 2.5:1; wherein the condensate has a molar ratio of combined formaldehyde to nitrogenous compound in the range of 0.5:1 to 1.5:1; wherein the molar ratio of combined phenol to nitrogenous compound is in the range of about 0.61:1 to 2:1 producing an antipunk resin system; and wherein the resin system contains sufficient methylolated 2,2'-and 2,4'-dihydroxydiphenylmethanes to inhibit crystallization of the resole.

2. The aqueous phenolic resin system of claim 1 wherein the resole comprises between 5 and 90 weight percent of methylolated dihydroxydiphenylmethanes of which between 5 and 50 weight percent are methylolated 2,2'- and 2,4'-dihyroxydiphenylmethanes.

3. The aqueous phenolic resin system of claim 1 wherein the resole comprises less than 1 weight percent free phenol and less than 1 percent free formaldehyde.

4. The aqueous phenolic resin system of claim 1 which comprises additionally between about 0.1 and 5.0 parts by weight of a proteinaceous compound, soluble in aqueous media at a pH of 7 to 10, per 100 parts by weight of the resin system solids.

5. The aqueous phenolic resin system of claim 4 wherein the proteinaceous compound is casein.

6. The aqueous phenolic resin system of claim 4 wherein the proteinaceous compound is soya protein.

7. An emulsified aqueous phenolic resin obtained by adding water beyond the water tolerance point to the aqueous phenolic resin system of claim 4.

8. A process for preparing an aqueous solution of a phenolic antipunk resin system which comprises:
a. reacting 1.0 mole phenol with from 0.05 to 0.30 moles formaldehyde under conditions for formation of novolac resin,
b. adding from 1.75 to 4.0 moles formaldehyde and reacting under basic conditions to produce a resole of molecular weight less than 400 and water tolerance between about 50 and 800 percent, and containing less than 2 weight percent free phenol;

c. adding between about 0.5 and 1.64 moles of a nitrogenous compound selected from the group consisting of ammonia, urea, dicyandiamide and melamine and reacting the nitrogenous compound to produce an antipunk resin system and to reduce the free formaldehyde content to less than 2 weight percent of the resole, and d. adjusting the pH to between 6 and 8.5 at 25°C.

9. The process of claim 8 wherein the pH is adjusted to between about 7 and 8.

10. The process of claim 8 wherein the novolac reaction in step (a) is carried out in the presence of 0.001 to 0.02 mole equivalents of a soluble acid catalyst per mole of phenol at a temperature in the range of 60° to 200°C. and wherein the acid has a pK of less than 5.

11. The process of claim 10 wherein the acid has a pK of less than 2 and wherein the temperature is in the range of 100° to 120°C.

12. The process of claim 8 wherein the resole reaction of step (b) is carried out in the presence of a soluble basic catalyst of pK greater than about 9.0 at a temperature in the range of 40 to 80°C., the concentration of base being between about 0.05 to 0.3 mole equivalent per mole of phenol in excess of the amount required to neutralize the acid of the novolac reaction stage.

13. The process of claim 12 wherein the basic catalyst is selected from the group consisting of alkali metal hydroxides, alkali metal carbonates, alkaline earth hydroxides, ammonia and amines of molecular weight less than 300.

14. The process of claim 8 wherein the resole reaction of step (b) is carried out at a temperature in the range of 50° to 70°C.

15. A process for preparing an aqueous solution of an emulsifiable phenolic resin system which comprises:
a. reacting 1.0 mole phenol with from 0.05 to 0.30 moles formaldehyde under conditions for formation of novolac resin,
b. adding from 1.75 to 4.0 moles formaldehyde and reacting under basic conditions to produce a resole of molecular weight less than 400 and water tolerance between about 50 and 800 percent, and containing less than 2 weight percent free phenol, c. adding between about 0.5 and 1.64 moles of a nitrogenous compound selected from the group consisting of ammonia, urea, dicyandiamide and melamine and reacting the nitrogenous compound to reducee the free formaldehyde content to less than 2 weight percent of the resole, d. adjusting the pH to between 6 and 8.5 at 25°C., and e. adding between about 0.1 and 5.0 parts by weight of a proteinaceous compound soluble in aqueous media at a pH of 7 to 10, per 100 parts by weight of the resin system solids.

16. The process of claim 15 wherein the novolac reaction stage is carried out in the presence of a soluble acid catalyst of pK less than 5 at a temperature in the range of 60° to 200°C., the mole ratio of phenol to acid catalyst being in the range of 1000:1 to 50:1, wherein the resole reaction stage is carried out in the presence of a soluble basic catalyst of pK greater than about 9.0 at a temperature in the range of about 40° to 80°C., the concentration of basic catalyst being between about 0.05 to 0.3 mole equivalent per mole of phenol in excess of the amount required to neutralize the acid of the novolac reaction stage and wherein the proteinaceous compound is selected from the group consisting of soya protein and casein.

17. The process of claim 16 wherein the novolac reaction stage is carried out at a temperature in the range of 100 to 120°C. with an acid catalyst of pK less than 2, wherein the resole reaction stage is carried out at a temperature in the range of 50° to 70°C. with a basic catalyst selected from the group consisting of alkali metal hydroxides, alkali metal carbonates, alkaline earth hydroxides, ammonia and amines of molecular weight less than 300.

18. The process of claim 15 wherein the pH is adjusted to between about 7 and 8 at step (d).

19. A process for preparing an emulsified aqueous phenolic resin system by adding water beyond the water tolerance point to the product of the process of claim 15.

* * * * *